Feb. 27, 1968
H. B. WATTSON
VOLTAGE REGULATOR INCLUDING MEANS FOR
ELIMINATING RIPPLE OUTPUT VOLTAGES
Filed May 18, 1964
3,371,269
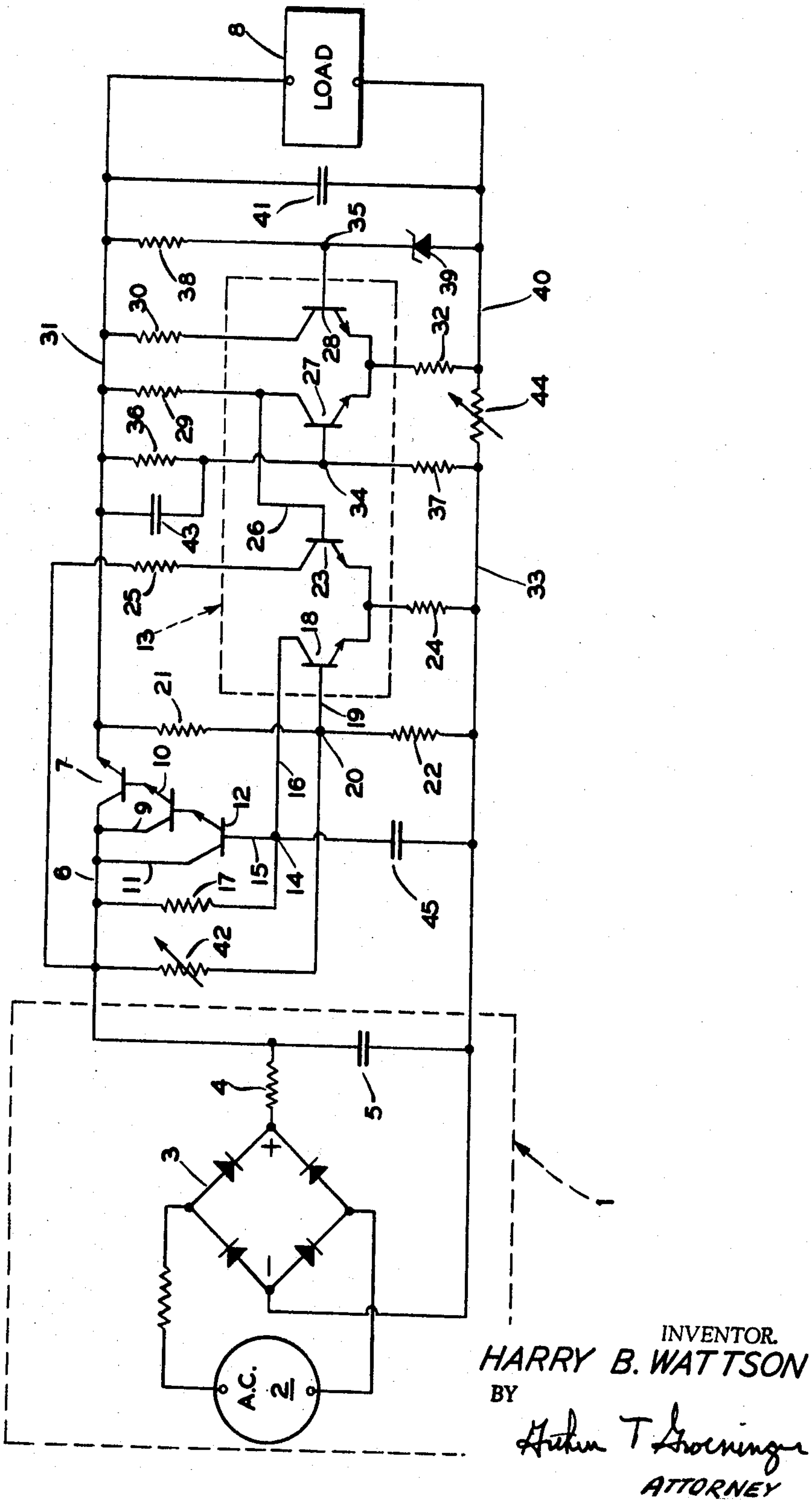
INVENTOR.
HARRY B. WATTSON
BY
Arthur T Groeninger
ATTORNEY United States Patent Office 3,371,269

Patented Feb. 27, 1968

3,371,269

VOLTAGE REGULATOR INCLUDING MEANS FOR ELIMINATING RIPPLE OUTPUT VOLTAGES

Harry B. Wattson, Rutherford, N.J., assignor to The Bendix Corporation, Teterboro, N.J., a corporation of Delaware Filed May 18, 1964, Ser. No. 368,263
4 Claims. (Cl. 323—22)

ABSTRACT OF THE DISCLOSURE

A voltage regulator including a control transistor connected between a load and a supply source. A network is provided for controlling the current flow through the control transistor to maintain a constant voltage across the load. The network includes a differential amplifier and means are connected between the control transistor and the differential amplifier for introducing into said network a signal for eliminating ripple output voltages.

The present invention relates to a voltage regulator capable of providing very precise and stable power supply voltages.

Briefly, the present invention includes a main regulating transistor connected in series between a load and an unregulated supply source. The main regulating transistor functions as a variable impedance which is automatically controlled so that the output voltage across the load remains constant.

The control means for the main regulating transistor essentially comprises a voltage feedback circuit which includes a two-stage differential amplifier. The combined gain of these stages is quite high providing immediate and sharp attenuation of any variation in load voltage. In addition, differential amplifiers are quite stable since usual sources of drift tend to affect both halves of each stage similarly.

The differential amplifier is coupled to points of reference potential for sensing variations in load voltage. One of the points of reference potential varies in accordance with changes in load voltages while the other is maintained at a fixed potential. Each of the points of reference potential are connected to independent transistors, thereby minimizing transmission of disturbance therebetween. Means including a bypass capacitor is provided to make the varying potential reference point highly sensitive to ripple voltages resulting in sharp attenutation thereof. The fixed potential reference point is connected to the base of one of the differential transistor amplifiers and thus the current drawn from the reference point is cut by at least the beta of that transistor which makes possible much better stability.

In order to more perfectly eliminate the output ripple voltage, a resistive path, including a variable resistor, is connected between the input to the regulator circuitry and the feedback circuitry. The variable resistor may be adjusted to introduce into the feedback network a signal of such phase and magnitude as to substantially eliminate the ripple.

A further refinement of the present invention is provided by novel means for compensating for a momentary increase in load current. This means comprises a resistor connected in series with the load and across the base emitter circuit of the error sensing transistor in the differential amplifier. This resistor functions to introduce an incremental voltage in such a phase as to counteract the effect of the incremental change in the output introduced by a momentary increase in load current.

An object of the present invention is to provide an improved voltage regulator circuit capable of providing very precise and stable power supply voltages.

Another object of the present invention is to provide a voltage regulator employing a high gain two-stage differential amplifier in the feedback network for providing immediate and sharp attenuation of any variation in load voltage.

Another object of the present invention is to provide a voltage regulator including means for substantially eliminating ripples in the regulator output.

Another object of the present invention is to provide a voltage regulator including means for isolating the fixed potential reference point from disturbances.

Another object of the present invention is to provide means for introducing an incremental voltage in such a phase as to counteract the effect of an incremental change in output introduced by a momentary increase in load current.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose .

The drawing is a schematic diagram of one embodiment of the present invention.

Referring to the drawing, there is shown an unregulated direct current supply 1 comprising alternating current source 2 connected to the input terminals of a full wave bridge rectifier 3. The output from rectifier 3 is fed through current limiting resistor 4 to the regulator circuitry. A filtering capacitor 5 is connected across the output terminals of the rectifier 3 to smooth the pulsating D.C. supply current from rectifier 3.

The smoothed D.C. supply current is fed to regulating transistor 7 by conductor 6. Transistor 7 functions as a variable impedance controlling the flow of current to load 8.

Connected in cascade with transistor 7 are NPN current amplifying transistors 10 and 12 with the base of transistor 7 connected to the emitter of transistor 10 and the base of transistor 10 connected to the emitter of transistor 12. Transistor 10 is otherwise operatively connected having its collector connected by resistor 4 and conductors 6 and 9 to the positive terminal of rectifier 4. Transistor 12 is otherwise operatively connected having its collector connected by resistor 4 and conductors 6 and 11 to the positive terminal of rectifier 3. Transistors 10 and 12 operate in cascade with transistor 7 with the combined gain equal to the product of the individual gains of the respective transistors. Transistors 10 and 12 are employed for impedance matching purposes in order to connect the high impedance output from amplifier 13 to the low impedance input of transistor 7 without an excessive loss in the signal output from amplifier 13.

Amplifier 13 is a two-stage difference amplifier. Variations in load voltage cause a concurrent and proportional variation in the output from amplifier 13. The output from amplifier 13 thus represents an error signal capable of controlling transistor 12 and in turn transistor 7 so as to maintain the voltage across load 8 constant. The combined gain provided by the two stages of amplifier 13 is very high providing immediate and sharp attenuation of any variation in load voltage. In addition, operation of the amplifier 13 is quite stable as usual sources of drift tend to affect both halves of each stage similarly.

The output from amplifier 13 is taken from the collector of transistor 18. The base of transistor 12 and collector of transistor 18 are connected together at junction point 14 by conductors 15 and 16, and junction point 14 is connected by resistor 17 to input lead 6. The base of transistor 18 is connected by conductor 19 to junction point 20. Junction point 20 is a junction point between resistors 21 and 22 which form a voltage divider network connected in parallel with load 8.

Transistor 18 comprises one side of one stage of two-stage amplifier 13. The other side of this stage comprises transistor 23. The emitters of transistors 18 and 23 are connected to each other and through a common resistor 24 to conductor 33 which connects the lower side of load 8 to the negative terminal of rectifier 3. The collector of transistor 23 is connected by a resistor 25 to input conductor 6.

The base of transistor 23 is connected by a conductor 26 to the collector of transistor 27. Transistor 27 comprises one side of the other stage amplifier 13. The other side of this stage comprises transistor 28. The collectors of transistors 27 and 28 are connected, by resistors 29 and 30, respectively, to conductor 31. The emitters of transistors 27 and 28 are connected together and through a common resistor 32 to conductor 40 which connects the lower side of load 8 to negative return line 33.

The bases of transistors 27 and 28 are connected to first and second points of reference potential 34 and 35, respectively, for sensing variations in load voltage. Variations in load voltage cause concurrent variations in potential at the first point of reference potential 34. Reference point 34 is a junction point between voltage dividing resistors 36 and 37 which are connected across load 8.

The second point of reference potential 35 is a junction point between resistor 38 and zener diode 39 which are also connected across load 8. Zener diode 39 functions to maintain reference point 35 at a substantially fixed voltage in spite of variations in the load voltage.

Any variation in the load voltage causes a concurrent and proportional variation in the collector potential of transistor 27. In effect, a difference or error signal is fed by conductor 26 to the second stage of differential amplifier where the error signal is amplified. The amplified error signal from differential amplifier 13 is fed by conductors 15 and 16 to the base of current amplifying transistor 12. The amplifier error signal controls transistor 12, which, in turn, controls transistors 10 and 7 so as to maintain the voltage across the load 8 constant. Capacitor 45, which connects junction point 14 to conductor 33, functions as a bypass capacitor limiting the gain at high frequencies to prevent oscillations.

Capacitor 41, connected across the output, prevents any high frequency oscillation which might result from using high gain amplifier 13 in the feedback network. It also insures that the output impedance of the power supply will be low even at frequencies beyond the band-pass of the amplifier 13.

A further refinement is provided by the addition of a bypass capacitor 43 across voltage dividing resistor 36. The capacitor 43 provides an alternating current path of comparatively low impedance around resistor 36. This makes error sensing point 34 highly sensitive to ripple voltages resulting in sharp attenuation thereof.

The ripple is further reduced by the use of a variable feedback resistor 42 connected between input conductor 6 and the base of transistor 18. While the ouput ripple voltage is substantially attenuated by the filtering capacitor 5 and the regulator circuitry, hereinbefore described, it is more perfectly eliminated by variable resistor 42. Variable resistor 42 may be adjusted to introduce into the feedback network at the base of transistor 18 a signal of such phase and magnitude as to substantially eliminate the ripple.

A still further refinement is provided by variable resistor 44 serially connected by conductor 40 to the lower terminal of load 8 and by conductor 33 to the negative terminal of rectifier 3. By adjusting resistor 44, it is possible to obtain positive, zero, or negative load current compensation. Variation in load current causes a concurrent variation in the voltage drop across the base emitter circuit of resistor 44. As a result, an incremental voltage is introduced across the base emitter circuit of error sensing transistor 27 in such a phase as to counteract the effect of incremental change in output introduced by the momentary increase in load current.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A voltage regulator comprising, a supply source, a load, a control transistor connected in series between said supply source and said load for controlling the current flow therebetween, a first network connected across said load for providing a first point of reference potential which varies in accordance with variations in the voltage across said load, a second network connected across said load for providing a second point of reference potential, means for maintaining said second point of reference potential at a substantially fixed potential, a first differential amplifier coupled to said first and second points of reference potential for providing an error signal proportional to the difference between the actual and desired load voltage, a second differential amplifier connected to receive and amplify said error signal, signal amplifying means coupled between said second differential amplifier and said control transistor and responsive to the output from said second differential amplifier for controlling the current flow through said control transistor to maintain the voltage across said load constant, and adjustable means connected to the second amplifier and to the control transistor for providing a signal of a phase and magnitude to substantially eliminate ripple output voltages.

2. Apparatus as defined by claim 1, said first differential amplifier comprising first and second transistors, said first point of reference potential being connected to the base of said first transistor and said second point of reference potential being connected to the base of said second transistor, said amplifier comprising third and fourth transistors with the base of the third transistor being connected to the collector of the first transistor, and the adjustable means being connected to the base of the fourth transistor and to the collector of the control transistor.

3. A voltage regulator comprising a pair of input terminals, a pair of output terminals, a control transistor connected in series between one of said pair of input terminals and one of said pair of output terminals, a resistor connected in series between the other of said pair of input terminals and the other of said pair of output terminals, an unregulated power supply connected between said input terminals, a load connected between said output terminals, means responsive to variations in load voltage for varying the current flow through said control transistor to maintain the voltage across said load constant, said last mentioned means including means responsive to the voltage drop across said resistor for counteracting an incremental change in output introduced by a momentary increase in load current, and means connected to the control transistor and to the means responsive to variations in load voltage for substantially eliminating ripple output voltages.

4. A power supply source comprising a supply having positive and negative terminals, a load, a control transistor connected in series between the positive terminal of said supply source and said load, a network connected to the control transistor and connected to the load for controlling the current flow through said control transistor to maintain the voltage across said load constant, means connected to the network and to the control transistor for introducing into said network a signal of such phase and magnitude to substantially eliminate output ripple voltages, a capacitor connected to said network and to the negative terminal of said supply source for limiting the gain of said network to prevent oscillations, a capacitor connected across said load for ensuring that the output impedance of the power supply is low.

References Cited

UNITED STATES PATENTS

| | | | |
|---|---|---|---|
| 2,980,845 | 4/1961 | Thompson et al. ______ | 323—22 |
| 3,076,135 | 1/1963 | Farnsworth et al. ____ | 323—22 |
| 3,103,617 | 9/1963 | Schneider et al. ______ | 323—22 |
| 3,114,873 | 12/1963 | Love _______________ | 323—22 |
| 3,069,617 | 12/1962 | Mohler _____________ | 323—22 |
| 3,201,680 | 8/1965 | Ross ________________ | 323—9 |
| 3,241,042 | 3/1966 | Rosenfeld ___________ | 323—22 |

JOHN F. COUCH, *Primary Examiner.*

K. D. MOORE, W. E. RAY, *Assistant Examiners.*